May 6, 1924.
R. C. MATHES
VACUUM TUBE FILAMENT AND PLATE COMPENSATION
Filed Feb. 17, 1919

1,493,216

Inventor:
Robert C. Mathes
by J. E. Roberts, Atty.

Patented May 6, 1924.

1,493,216

UNITED STATES PATENT OFFICE.

ROBERT C. MATHES, OF NEW YORK, N. Y., ASSIGNOR TO WESTERN ELECTRIC COMPANY, INCORPORATED, OF NEW YORK, N. Y., A CORPORATION OF NEW YORK.

VACUUM-TUBE FILAMENT AND PLATE COMPENSATION.

Application filed February 17, 1919. Serial No. 277,566.

*To all whom it may concern:*

Be it known that I, ROBERT C. MATHES, a citizen of the United States, residing at New York, in the county of Bronx and State of New York, have invented certain new and useful Improvements in Vacuum-Tube Filaments and Plate Compensations, of which the following is a full, clear, concise, and exact description.

This invention relates to vacuum tube repeaters or amplifiers and more particularly to means for compensating for changes in potential of the batteries used for supplying the space current and for heating the filament.

As is well known, variations in these batteries tend to undesirably influence the output of the tube or system of tubes, since the output should, of course, contain only such variations as are impressed on it by the input circuit. It is also well known that it is possible to control the output current by means of voltages impressed on the grid. It is the object of this invention to prevent fluctuation of the batteries supplying space current and heating current from affecting undesirably the operation of the repeater. This is accomplished by connecting the grid of a vacuum tube to suitable points in circuit with (a) the space current battery or (b) the heating current battery, or both, so as automatically to compensate for fluctuations in the potential of these batteries.

Other objects of the invention will appear more fully from the following description and claims taken in connection with the accompanying drawings, in which—

Figure 1:
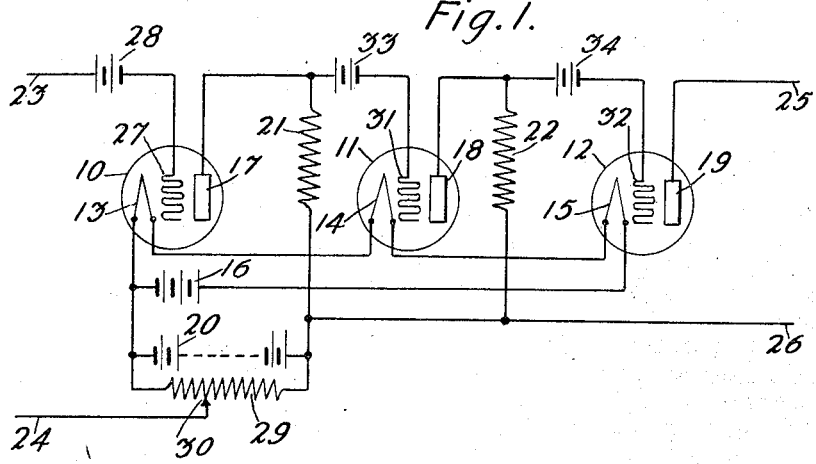
Fig. 1 shows the invention applied to the space current battery of an amplifier having three tubes arranged in tandem.

In the arrangement shown in Fig. 1, three tubes 10, 11 and 12 are used for successive stages of amplification. The filaments or cathodes 13, 14 and 15 are connected in series and are heated by a battery 16. The anodes or plates 17, 18 and 19 are connected in parallel to one end of the battery 20, the other end of battery 20 being connected to the filament circuit in the usual manner. Impedances 21 and 22 are placed between plates 17 and 18 and the battery 20, and a similar impedance may, if desired, be placed between the plate 19 and the battery. These impedances may, in practice, assume the form of resistances of the order of the internal resistances of the tubes with which they are associated. It will be understood that the connections 23 and 24 are comprised in the input circuit and connections 25 and 26 in the output circuit of the amplifier. Connection 23 leads to grid 27 of the first tube and a battery 28 is employed to maintain the grid preferably always negative with respect to the filament 13 which is connected to the input circuit through the resistance 29 and the adjustable contact 30. Grids 31 and 32 are connected at the plate ends of the impedances 21 and 22 and batteries 33 and 34 are employed to maintain these grids negative with respect to their respective filaments.

The operation of this arrangement in general is well understood in the art. The variable voltages or currents supplied to one tube are amplified and impressed in amplified form on the succeeding tube, and so on until in the output circuit of the last tube any desired use of the amplified variations can be made by the use of suitable connections or instruments. This invention, as illustrated in Fig. 1, has particularly to do with means for preventing or minimizing undesirable variations caused by changes in the potential of battery 20, due to charging or discharging the battery or other causes. Normally, if the potential of battery 20 rises, there will be a corresponding increase in the drop in potential between plate 17 and filament 13 and between grid 31 and filament 14. This may be prevented by setting the adjustable contact 30 at a suitable point on the resistance 29, which is bridged about the battery 20. By this means, when the potential of the battery increases, the potential of grid 27 will become less negative and the impedance of the space between plate 17 and filament 13 will be lowered, the potential drop therebetween being maintained at its original value, although the current from plate to filament has been increased. By suitably changing the contact 30 on the resistance 29, the operation of a succeeding tube can be made constant. For example, if it be desirable, the space current of the last tube can be maintained constant.

Figure 2:
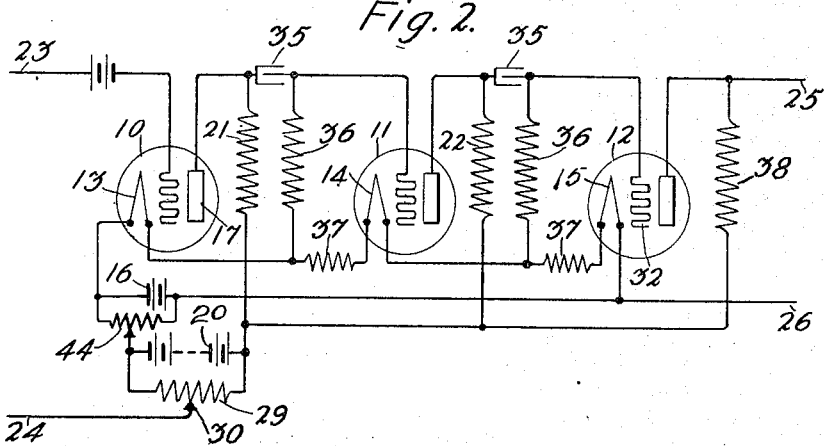
Fig. 2 shows a similar arrangement wherein the output of one tube is supplied to the input circuit of the succeeding tube through a condenser.

In Fig. 2 is shown an arrangement which is similar to that of Fig. 1, in that three vacuum tubes are connected in tandem. Corresponding parts are designated by the same reference numerals. This arrangement differs from that shown in Fig. 1, in that the plate potential variation of each tube, except the last, is impressed on the grid of the succeeding tube through the intermediary of a condenser 35. An impedance 36 is connected between the filament circuit and the grid, one of the functions of this impedance being to equalize static conditions which may tend to exist in the tube because of the condenser. This impedance may, in practice, be a resistance of the order of a megohm. An impedance 37 is placed in the filament heating circuit between each impedance 36 and the negative end of the corresponding filament, for the purpose of rendering the grid negative with respect to the filament of its respective tube. An additional impedance 38 is shown between the battery 20 and the plate of tube 12. This impedance may or may not be present according to the nature of the output circuit. The operation of resistance 29 and contact 30 is the same as described above in connection with Fig. 1. A means of compensation for fluctuations of the heating current battery is shown at 44. The operation thereof will be described later on in connection with Fig. 4.

The arrangement shown in Fig. 2 will compensate for rapid fluctuations for which the impedance of the condensers 35 is negligible. The arrangement shown in Fig. 1 will compensate for both rapid and slow fluctuations.

Changes in the filament heating current may have two different effects on the output of a tube, depending on whether the filament is operating at saturation or not. As the filament temperature is increased from low to high, there is a rapid increase in space current which gradually approaches a constant value, and finally falls off slowly, if the grid is connected to the negative end of the filament.

Figure 3:
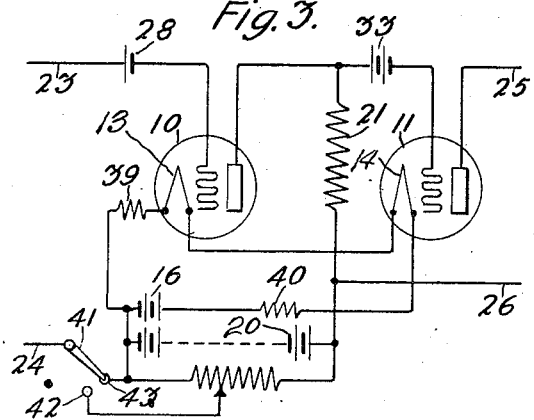
Fig. 3 shows a two-stage amplifier having means to compensate for variations both of the space current battery and of the heating current battery, when the cathode is operated at a temperature below that which will produce the maximum space current.

In Fig. 3 is shown an apparatus designed to compensate for changes in the filament heating battery when the filament is being operated at a temperature below that which will produce the maximum space current. An impedance 39 is interposed between the negative end of battery 16 and filament 13, so that an increase in the potential of battery 16 will make the grid more negative with respect to the filament, thus increasing the impedance of the tube and holding the space current constant. In some cases it may be found desirable to place an additional impedance 40 in the heating current circuit. The compensating feature described in connection with Fig. 1 may be combined with this arrangement by throwing the switch 41 to contact 42 instead of contact 43.

Figure 4:
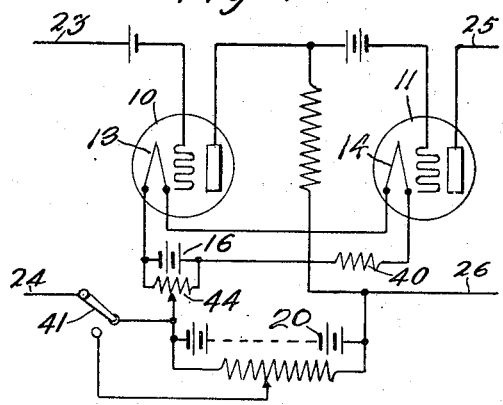
Fig. 4 shows an arrangement similar to that of Fig. 3, having means of compensation for variations in the heating current battery adapted for use when the cathode is operated at a temperature at or above that which will produce the maximum space current.

In Fig. 4 is shown an arrangement similar to that of Fig. 3, but designed to compensate for changes in the battery 16 when the filament is being operated, at or above the temperature which will produce the maximum space current. In this case, an increase in the temperature of the filament above the saturation temperature normally tends to slightly decrease the space current. When the grid is connected to the negative side of the filament, and the potential of the source of heating current is increased, there is an increase in total potential across the filament, thus increasing the average negative relation between grid and filament, and decreasing the space current. An impedance 44 is connected in parallel with the battery 16 and an adjustable connection made therefrom to the grid through the input circuit. As the battery increases in potential, the grid is made less negative, thereby maintaining the space current constant.

While the invention has been schematically illustrated in certain embodiments thereof, it is to be understood that it is not limited to the forms shown, but may assume other forms within the scope of the appended claims. For example, while the grid or auxiliary electrode is shown as being within the tube, it is well known that it is not necessary to place it within the tube. Likewise, the anode may be made in any desired form instead of in plate form as shown. Further, the invention obviously is not limited to impressing the battery fluctuations on the auxiliary electrode of the first tube of a series, for these fluctuations may be by-passed to any portion of the associated circuits where it may be desirable to change the impedance or other electrical characteristics thereof.

What is claimed is:

1. In a multi-stage vacuum tube amplifier, a coupling between two tubes comprising a connection from the anode of one tube to the auxiliary electrode of another tube, an impedance between said connection and the source of space current, and means responsive to an effect produced by the source of space current for controlling the drop in potential across said impedance.

2. In a multi-stage vacuum tube amplifier, two amplifying devices, the output circuit of the first device being connected to the input circuit of the second device, a source of current for said output circuit, and means responsive to an effect of said source of current and including an element of said first amplifying device for controlling the operation of said second amplifying device.

3. Means for amplifying small unidirectional currents comprising an electron discharge device having plate and grid circuits, an ohmic resistance included in the grid circuit through which the unidirectional current is caused to flow, and means for causing the drop in potential between one end of said resistance and the source of said current to change at a different rate from changes in the potential of said source.

4. The combination of an amplifier, an impedance in circuit therewith, a vacuum tube device in circuit with said impedance, a source of current adapted to energize said amplifier, and means for automatically controlling the drop in potential across said impedance.

5. A vacuum tube comprising an anode, a cathode, means for supplying current therebetween, an impedance, the drop in potential across which varies in accordance with the impulse to be transmitted, and means responsive to an effect produced by said supplying means for controlling the potential across said impedance.

6. The combination of a plurality of vacuum tube device connected in tandem, a source of variable potential for supplying space current for one of said vacuum tube devices, and means for so altering the impedance of said device as to prevent variations in said source from affecting the operation of a succeeding vacuum tube device.

7. In a vacuum tube repeater having a series of vacuum tubes connected in tandem, each tube having a cathode, an anode and an auxiliary electrode, a heating circuit for the cathode of one of said tubes comprising a source of current and a resistance, a source of space current for said tube, a resistance bridged about said source of space current, and a connection from said cathode to the corresponding auxiliary electrode including parts of said resistances in series.

8. The combination of a plurality of vacuum tube devices, each having a cathode, an anode, and an auxiliary electrode, a source of variable potential for supplying space current for said tube, a source of variable potential for heating said cathode, and means for automatically impressing variations of both said sources on the auxiliary electrode of the first tube.

9. In a repeater circuit, a vacuum tube having a cathode, an anode and an auxiliary electrode, a source of current in series with said cathode and said anode, a second vacuum tube having a heated cathode, an anode and an auxiliary electrode, means for maintaining a flow of current between the cathode and anode of the second tube, the auxiliary electrode of the second tube being connected to the output circuit of the first tube, a resistance bridged around said source of current, and a connection from a point on said resistance to the auxiliary electrode of the first tube.

10. In a repeater circuit, a vacuum tube having a cathode, an anode and an auxiliary electrode, a source of variable current in circuit with said cathode and said anode, a resistance in parallel with said source of current and a connection from a point on said resistance to said auxiliary electrode, said point being so chosen that the potentials on said grid compensate for variations in said source.

11. In a repeater circuit, a vacuum tube having a cathode, an anode and an auxiliary electrode, a source of current in circuit with said cathode and said anode, means for maintaining said auxiliary electrode negative with respect to said cathode, a resistance in parallel with said source of current, and a connection from a point on said resistance to said auxiliary electrode.

12. The method of controlling the operation of a vacuum tube repeater in which the potential of the source of space current is subject to variations and in which the input of the repeater is impressed on a grid which comprises making said grid more negative than any part of the space current circuit and automatically making said grid less negative as said source of space current increases in potential.

13. In a repeater circuit, a vacuum tube having a cathode, an anode and an auxiliary electrode negative with respect to every part of said cathode, a circuit including a resistance and a source of current for heating said cathode, and an adjustable connection for impressing on said grid a desired amount of the drop in potential across said resistance.

14. In a repeater circuit a vacuum tube having a cathode, an anode, and an auxiliary electrode, means for maintaining said auxiliary electrode negative with respect to every part of said cathode, a circuit including a source of current for heating said cathode and a resistance path connected across said source, and a connection from an adjustable point on said resistance path to said auxiliary electrode.

15. A multi-stage repeater comprising a plurality of vacuum tubes connected in tandem, a variable source of space current for the last tube of the series, and means deriving an electrical characteristic from said source of current for controlling said space current of said last tube, said means comprising an electrode of a preceding tube.

16. A multi-stage repeater comprising a plurality of vacuum tubes connected in tandem, a variable source of space current for said tubes, a control electrode in one of said tubes, and means for maintaining the output current of the repeater substantially constant, said means comprising a connection from said source of current to said control electrode.

17. A system comprising a receiving device, a source for supplying electromotive force thereto, the voltage of said source being subject to variations, an electron tube having a cathode, an anode and an auxiliary electrode, said source being in circuit with said cathode and said anode, a resistance connected across said source, and a connection from a point on said resistance to said auxiliary electrode, said point being so chosen that the potentials on said grid compensate for the variations in said source.

18. A system comprising a receiving device, a source of electromotive force, the voltage of said source being subject to variations, a resistance, connections for supplying electromotive force from said source to said translating device through said resistance, a resistance connected across said source, and a three electrode electron tube having its cathode-anode circuit connected across said translating device and having its grid connected to such a point on said last mentioned resistance that the potentials on said grid compensate for the variations in said source.

In witness whereof, I hereunto subscribe my name this 7th day of February A. D., 1919.

ROBERT C. MATHES.